Sept. 20, 1960  G. E. KEEFER  2,953,613
METHOD FOR INSTALLING FURNACE ELECTRODE
Original Filed Dec. 28, 1956  2 Sheets-Sheet 2
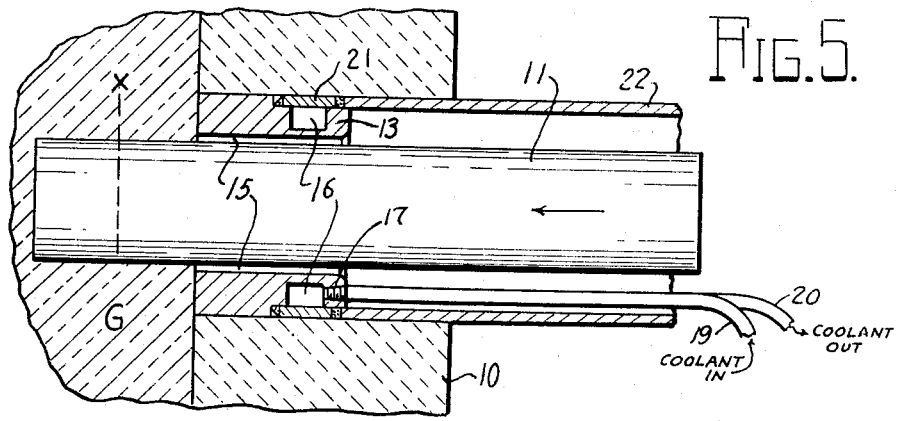
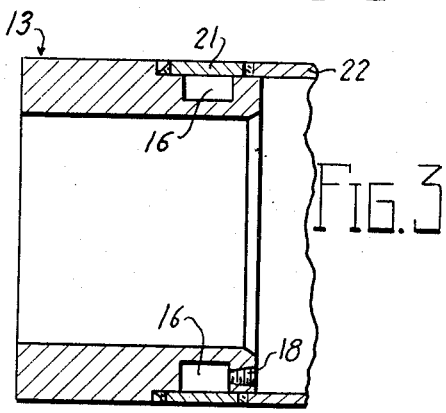
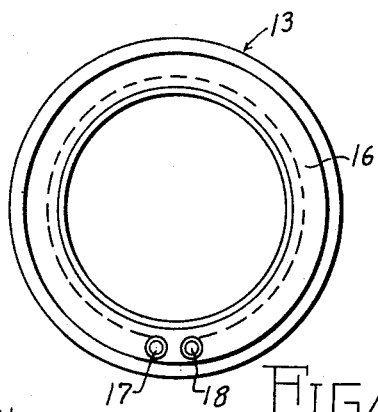
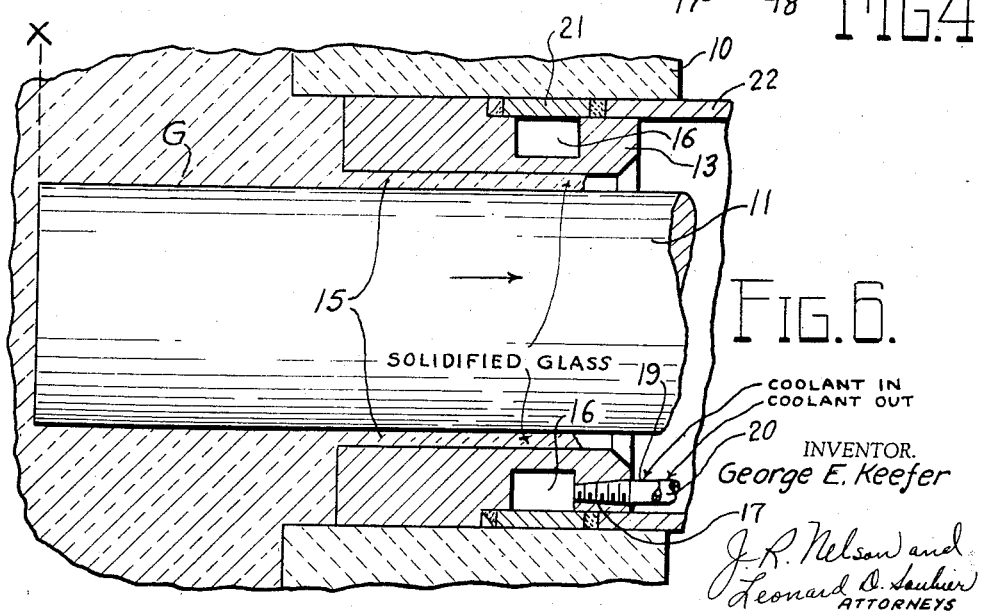
INVENTOR.
George E. Keefer
ATTORNEYS United States Patent Office 2,953,613
Patented Sept. 20, 1960

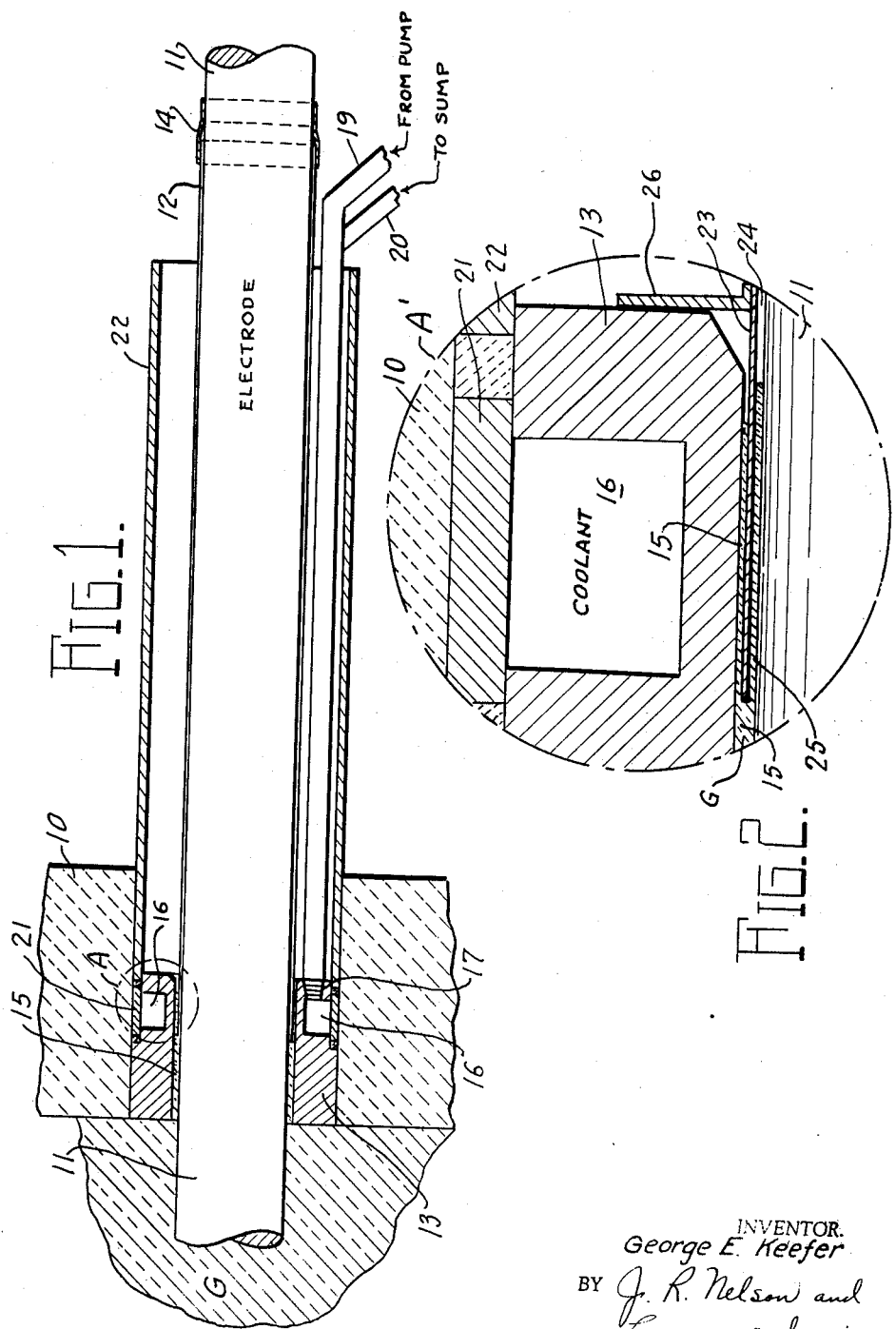

2,953,613

METHOD FOR INSTALLING FURNACE ELECTRODE

George E. Keefer, Sylvania, Ohio, assignor to Owens-Illinois Glass Company, a corporation of Ohio Original application Dec. 28, 1956, Ser. No. 631,112. Divided and this application Nov. 14, 1958, Ser. No. 774,033

3 Claims. (Cl. 13—17)

This invention relates to installation of furnace electrodes in a side or bottom wall aperture of an electric melting furnace, primarily designed for use in melting glass in which the heating effect on the glass, or batch materials, in the furnace is secured by the resistance of the material to the passage of current, and more particularly to a method of electrode installation, which installation eliminates oxidation or burn-off damage to the electrode.

This application is a division of my copending application, Serial No. 631,112, filed on December 28, 1956.

Certain electrodes, while very suitable for a desired service in many particulars, have the disadvantage of tending to burn-off or oxidize within the furnace wall through which they extend. At the inner end, the electrode is covered by the molten glass and, therefore, is protected from oxidation, but inside the furnace wall and outwardly therefrom there is no such protection and the electrode operating at elevated temperatures will be seriously damaged by burn-off in a comparatively short time by oxidation promoted by the gradual infiltration of air at the furnace wall joint between the electrode and the wall. The exposure to air thus supplies the oxygen necessary to produce oxidation of the electrode material at the characteristic high temperatures existing at or near the furnace wall.

Electrodes are also water cooled at their furnace wall juncture to cool the electrode portion most susceptible to oxidation below the critical oxidation temperature of the electrode material. One cooling means used, heretofore, has been the continuous discharge of water directly onto the electrode adjacent the outer end of the electrode mounting in the furnace wall, which mounting usually comprises a bushing member mounted in the wall aperture through which the electrode is inserted. The electrode cooling water, after discharge into the electrode, is not easily controlled and frequently spills onto the refractories, steel structure and walkways around the furnace, damaging the furnace and creating an electric shock hazard to persons coming into that area. Also, as is often the case with these cooling devices, the water discharged onto the electrode evaporates in the electrode holder causing deposits of solids in the cooling system which will gradually close off circulation of the coolant water, and results in accelerated damage to the electrode.

It is, therefore, an object of the present invention to provide an electrode installation wherein the electrode is shielded from oxidation to overcome the burn-off of the electrode in the furnace wall.

Another object of the invention is a method of installing an electrode in a furnace.

Another object of the invention is to provide a method of installing the electrode in the furnace wall in such a manner as to prevent oxygen from entering the joint and causing electrode oxidation at or internally of the furnace wall.

The specific nature of this invention, as well as other objects and advantages thereof, will become apparent to those skilled in the art from the following detailed description, taken in conjunction with the annexed drawings on which, by way of preferred example only, are illustrated several embodiments of this invention.

In the drawings:

Fig. 1 is a longitudinal sectional elevational view of the electrode installation, embodying this invention, in operative position in the wall of a glass furnace.

Fig. 2 is an exploded sectional view A' of encircled portion A of Fig. 1, illustrating a modification of the invention.

Fig. 3 is a longitudinal sectional elevational view through the center of the electrode bushing and shows an enclosed water jacket therein for circulating coolant.

Fig. 4 is a right end elevational view of the bushing in Fig. 3.

Fig. 5 is a longitudinal sectional elevational view of the electrode inserted axially through the wall mounted bushing to a distance beyond the normal operating position X of the electrode, and illustrates one of the steps of a further modification of the method of the invention.

Fig. 6 is an enlarged sectional elevational view, similar to Fig. 5 wherein the electrode is withdrawn axially to its normal operating position X and illustrates a subsequent step of this last-mentioned modification of said method.

In Fig. 1, 10 is one of either the side or bottom walls of a furnace of refractory material, such as clay or fire brick, and G is a body of molten material, such as glass, into which a mounted electrode 11 extends submerged in said material. Electrode 11 is provided with a sheath 12 extending over a portion of the length of electrode 11 and is placed thereon so that the inner end of sheath 12 is received within bushing 13 when electrode 11 is inserted therethrough and placed in its normal operating position.

Sheath 12 is applied to electrode 11 before it is assembled in the furnace wall 10, and, as is shown in this embodiment of the invention, in intimate contact with the electrode 11. Sheath 12 is sealed at each end to prevent oxygen in the air from reaching the electrode. This seal is accomplished in the following manner.

The sheath 12 is preferably applied to electrode 11 before the electrode is installed by slipping a preformed sleeve of material of a size to provide a snug or a press fit onto the body of electrode 11. When sheath 12, in the form of the sleeve, is in place a sealing member 14 is placed over the outer end of the electrode and secured to the sleeve and electrode to make an air-tight seal therebetween. The inner end of sheath 12 is sealed in glass in bushing 13 after assembly, as will hereinafter be described. The sleeve making up sheath 12 can be one of several materials, preferably metallic, which will resist oxidation at elevated temperatures.

After sheath 12 is in place, electrode 11 is installed by inserting its inner end through bushing 13, which is mounted in the aperture of furnace wall 10. The bore of bushing 13 is preferably a loose fit allowing some annular clearance between it and the outer surface of electrode 11. Electrode 11 is inserted to a point where the inner end of sheath 12 is received by bushing 13. The molten glass G about electrode 11, when sufficiently fluid, will enter the annular space 15 between the electrode and bore of bushing 13, and will flow past the inner end of sheath 12 in the annular clearance space provided.

Bushing 13 has an annular chamber 16 intermediate its ends. Inlet and outlet ports 17 and 18, respectively, are tapped through the outer end of bushing 13 to communicate with chamber 16 (Figs. 3 and 4). Conduits 19 and 20 are connected, respectively, to inlet and outlet ports 17 and 18 to supply and exhaust a coolant. Coolant is supplied under pressure to conduit 19 from a pump (not shown) and circulated through chamber 16 (Fig. 1). The coolant is exhausted at port 18 and carried by conduit 20 to a pump or heat exchanger (not shown) for cooling and recirculation through the system. Chamber 16 is totally enclosed and sealed by annular collar 21 welded in place to define the outer diameter of chamber 16 (Fig. 1). Thus, the coolant is circulated in a totally enclosed system and is not applied directly to the electrode, thereby eliminating deposit of solids, damage to the furnace and electric shock hazard to persons in the area. An outer holder sleeve 22 is butt welded at one end in bushing 13 to collar 21 and extends outwardly to provide a protective housing for electrode 11.

Electrode 11 is inserted through bushing 13, as previously stated, and supported at its outer end in operating position by conventional support member (not shown) connected to the furnace structure. The electrode 11 has an operative connection at its outer end (not shown) to an electrical circuit for supplying energy. Molten glass G will flow into annular space 15 between electrode 11 and bushing 13 and beneath sheath 12 and bushing 13. Coolant is then circulated through chamber 16 to remove heat from the interior portions of bushing 13 and from the molten glass entrant adjacent thereto. The loss of temperature of the glass occupying space 15 causes it to freeze, first between sheath 12 and bushing 13, since it is thinner in cross section, and then between bushing 13 and electrode 11. The glass forms an air-tight seal between the inner end of sheath 12 and electrode 11, and when it is cooled sufficient to solidify in annular space 15 it forms a seal to prevent any leakage of molten glass from the furnace at the electrode joint.

The effect of cooling the internal portions of bushing 13 by circulation of coolant through chamber 16 performs four advantageous functions for the electrode mounting, namely: (1) It serves as a convenient and efficient means of sealing the inner end of sheath 12, as mentioned, to prevent air and its harmful oxygen ingredient from reaching the electrode at any vulnerable point along the electrode where the temperature thereof may be sufficient to cause damaging oxidation of the electrode, (2) it prevents molten glass from leaking out around the electrode or the bushing by freezing it in any accessible passageway, (3) it retards wear of the refractories adjacent the bushing by lowering the operating temperature at the adjacent supporting portions of the refractory defining the furnace wall aperture in which the bushing is mounted, and (4) it provides a stable end support for the electrode in the bushing.

This invention contemplates applying the sheath 12 to electrode 11 in other forms than the aforementioned snugly fit sleeve. The same air-tight sheath 12 may be provided on electrode 11 by plating a longitudinal portion of the electrode with a metal, examples of which are chrome, nickel or silver plating applied directly to the electrode over the desired portion. Another variant for applying sheath 12 is spraying a coating of metallic material having properties of high oxidation resistance directly to a longitudinal portion of electrode 11. Examples of such metallic materials are compositions of Al—Cr—Si, Cr—Mo—Si, Mo—Ni—Si, Fe—Si—, and Ni—Si.

Where the sheath 12 is applied to the electrode by either of the last-mentioned modified steps of the method by plating or spraying, the outer end seal 14, previously described, would be unnecessary, since either of these said types of applying the sheath would form its own airtight seal at either end thereof and prevent air from contacting the electrode where applied.

A still further modification of this invention is illustrated in Fig. 2, wherein an enlarged hollow sheath 23 is fitted over a longitudinal portion of electrode 11, and when fitted thereover defines an annular space 24 between its interior surface and the exterior surface of electrode 11. The spaced sheath 23 may be of any gas impermeable oxidation-resistant material, preferably a metallic material. The electrode 11 and assembled sheath 23 are inserted into bushing 13. In assembled position, electrode 11 extends through bushing 13, and the inner end of sheath 23 extends into bushing 13. A retaining lug 26, which is integral with sheath 23, engages the outer end of bushing 13. Lug 26 stops sheath 23 in its proper assembled position and serves as a holding means to permit sliding electrode 11 relative to sheath 23, so that, as the inner end of electrode 11 is consumed during use, it may be repositioned in the glass by sliding it into the furnace a sufficient amount while sheath 23 is held in its same position by lug 26. After electrode 11 and sheath 23 are thus installed, current is applied to electrode 11 to melt glass G. When glass G is at the proper viscosity, it will flow into annular space 15 between the bore of bushing 13 and electrode 11, part of which will flow into the inner end of annular space 24 between electrode 11 and sheath 23. Coolant is circulated through chamber 16, as previously described, and the temperature of the glass in the bushing joint solidifies to form a glass seal 25 between the inner end portion of sheath 23 and electrode 11.

A sealing member 14, such as shown in Fig. 1, is fitted over electrode 11 and sealed to the outer end of sheath 23 to make a fluid-tight seal thereat since this end of the electrode is operated at much lower temperatures due to its spacing outwardly of this furnace wall, any convenient form of seal may be utilized. An inert gas may be forced into annular space 24 before sealing member 14 is finally secured, thereby purging the air from annular space 24. The inert gas may be kept under a positive pressure and then sealing member 14 finally closed to retain annular space 24 filled with said gas under some amount of positive pressure to insure against infiltration of air therein. Another variant to this form of the invention just described (Fig. 2) is to omit filling the annular space 24 with inert gas and seal the outer end of sheath 23 to electrode 11 by sealing member 14 so as to entrap air in annular space 24 after the glass seal 25 is formed at its inner end. The very small quantity of oxygen in this small volume of entrapped air will react with electrode 11 at elevated temperatures to consume this oxygen and leave annular space 24 filled with a gas that will not react further with the electrode. The small amount of oxidation occurring to achieve this will be negligible and will not harm the electrode appreciably. By way of example, if the electrode is a carbon composition (graphite) or molybdenum, this small amount of oxygen in the air entrapped in annular space 24 will react at appropriate elevated temperatures to form either carbon dioxide or molybdenum dioxide. Neither of these gases will attack the electrode further.

Another variant of the method of the invention is illustrated in Figs. 5 and 6. In Fig. 5, it is seen that the bushing 13 is mounted in the aperture of furnace wall 10, and hooked up to receive and exhaust coolant in chamber 16 from conduits 19 and 20, respectively, as previously described. The bare electrode 11 is then inserted through bushing 13 provided with some clearance. The axial displacement of the electrode, indicated at X, defines the normal operating position of electrode 11, at which point it is to be mounted for operation and held by a conventional electrode support member (not shown) connected near the outer end of electrode 11. In this form of the invention, however, electrode 11 is inserted axially to extend into the molten glass G a predetermined distance beyond its normal operating position X. If the glass in the furnace is not to the appropriate viscosity to be fluid enough to be worked into annular space 15, electrode 11 is energized by connecting it into the electrical power circuit (not shown) and allowing it to heat a layer of glass around the inserted portion of the electrode to a viscosity such that it will adhere to this portion of the electrode. If the glass is already at the proper viscosity to achieve this, it is optional whether or not electrode 11 is energized. In either event, when the glass is of sufficient viscosity to be worked into annular space 15 between the bushing 13 and electrode 11, electrode 11 is withdrawn to its normal operating position X (Fig. 6). This withdrawal motion of electrode 11 works molten glass into annular space 15. As coolant is circulated through chamber 16 in bushing 13, the glass in annular space 15 is cooled and solidifies, thereby forming a glass seal around the electrode, giving the installation a seal having the aforementioned benefits of such a glass seal. Thus, the portion of electrode 11, namely, that lateral portion internally of the outer end of bushing 13, is sealed off from the air and shielded from oxidation. The outer portion of electrode which is exposed to the air may be exposed to some oxidation, depending on the characteristic of the electrode employed, however, the surface area of the electrode extending internally of bushing 13 is shielded, which area is the most susceptible to oxidation or burn-off.

It will, of course, be understood that various details of construction of the apparatus and steps of the method may be modified through a wide range without departing from the principles of this invention, and it is, therefore, not the purpose to limit the patent granted hereon otherwise than necessitated by the scope of the appended claims.

I claim:

1. The method of installing an electrode in a wall aperture of a glass melting furnace for providing an oxidation shield to said electrode comprising maintaining an electrode holder bushing in said wall aperture below the normal glass level of the furnace, said bushing having a hollow chamber therein adapted to receive and exhaust coolant, inserting the electrode through said bushing, its inner end extending axially into the glass contained in said furnace a predetermined distance beyond a normal operating position of said electrode, electrically energizing said electrode to form a layer of molten glass surrounding the inserted portion of the electrode, withdrawing said electrode into said bushing to a normal operating position of the electrode, whereupon molten glass is carried by the electrode into the bushing, and circulating coolant through the hollow chamber of said bushing, thereby solidifying said carried glass between the electrode and the bushing to form an air-tight seal therebetween.

2. The method of installing an electrode in a wall aperturee of a glass melting furnace for providing an oxidation shield to said electrode comprising maintaining an electrode holder bushing in said wall aperture below the normal glass level of the furnace, said bushing having a hollow chamber therein adapted to receive and exhaust coolant, inserting the electrode through said bushing, its inner end extending axially into the glass contained in said furnace a predetermined distance beyond a normal operating position of said electrode substantially equal to the axial dimension of said bushing, electrically energizing said electrode to melt a layer of glass surrounding the inserted portion of the electrode, withdrawing said electrode into said bushing to the normal operating position of the electrode, whereupon molten glass is carried by the electrode into the bushing, and circulating coolant through the hollow chamber of said bushing, thereby solidifying said carried glass between the electrode and the bushing to form an air-tight seal therebetween.

3. The method of installing an electrode in a wall aperture of a glass melting furnace comprising inserting the electrode through said wall aperture so that the inner end of said electrode extends axially into the glass material contained in said furnace a predetermined distance beyond a normal operating position of said electrode in said wall aperture, electrically energizing said electrode to form a layer of molten glass surrounding the inserted portion of the electrode, withdrawing said electrode into said wall aperture to the normal operating position of the electrode in said wall aperture, whereupon molten glass is carried by the electrode into said wall aperture, and cooling the wall about said aperture to solidify said molten glass in said wall aperture to form an air-tight peripheral seal between the electrode and the wall at said wall aperture.

References Cited in the file of this patent

UNITED STATES PATENTS

| | | |
|---|---|---|
| 2,636,914 | Arbeit | Apr. 28, 1953 |
| 2,693,498 | Penberthy | Nov. 2, 1954 |
| 2,736,759 | Penberthy | Feb. 28, 1956 |
| 2,798,892 | Penberthy | July 9, 1957 |
| 2,802,041 | Bramlett et al. | Aug. 6, 1957 |

FOREIGN PATENTS

| | | |
|---|---|---|
| 692,442 | Great Britain | June 3, 1953 |